United States Patent
Jennings, III et al.

(10) Patent No.: US 6,772,225 B1
(45) Date of Patent: Aug. 3, 2004

(54) POLICY ENABLED WEB CACHING

(75) Inventors: Raymond Byars Jennings, III, Ossining, NY (US); Dinesh Chandra Verma, Millwood, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/410,263

(22) Filed: Sep. 30, 1999

(51) Int. Cl.[7] .................. G06F 15/173; G06F 17/30
(52) U.S. Cl. .............. 709/240; 707/6; 709/219; 709/229
(58) Field of Search ................ 709/238–242, 709/219, 229, 226; 707/2, 10, 202, 6

(56) References Cited

U.S. PATENT DOCUMENTS

| | | | | |
|---|---|---|---|---|
| 5,924,116 A | * | 7/1999 | Aggarwal et al. | 711/122 |
| 6,006,264 A | * | 12/1999 | Colby et al. | 709/226 |
| 6,026,413 A | * | 2/2000 | Challenger et al. | 707/202 |
| 6,052,718 A | * | 4/2000 | Gifford | 709/219 |
| 6,112,279 A | * | 8/2000 | Wang | 709/203 |
| 6,138,162 A | * | 10/2000 | Pistriotto et al. | 709/229 |
| 6,185,598 B1 | * | 2/2001 | Farber et al. | 709/200 |
| 6,212,565 B1 | * | 4/2001 | Gupta | 709/229 |
| 6,330,561 B1 | * | 12/2001 | Cohen et al. | 707/10 |
| 6,345,303 B1 | * | 2/2002 | Knauerhase et al. | 709/238 |
| 6,351,775 B1 | * | 2/2002 | Yu | 370/237 |
| 6,374,300 B2 | * | 4/2002 | Masters | 709/229 |
| 6,449,647 B1 | * | 9/2002 | Colby et al. | 709/226 |

OTHER PUBLICATIONS

C. Aggarwal et al., "Caching on the World Wide Web", IEEE Transactions on Knowledge and Data Engineering, vol. 11, No. 1, Jan./Feb. 1999, pp. 94–107.

* cited by examiner

Primary Examiner—David Wiley
Assistant Examiner—George Neurauter
(74) Attorney, Agent, or Firm—F.Chau & Associates, LLC

(57) ABSTRACT

A policy enabled caching system based upon policy rules which define whether a request from a client is directed to a cache or a server. The client is coupled to a plurality of caches and to at least one server. The caches may store a subset of the data stored on the server. The policy enabled caching system stores policy rules which comprise at least one matching condition, where every request containing a matching condition falls into an associated class. Each class will have an associated routing rule, where a routing rule defines the type of routing for all the requests which fall into that class. The policy enabled caching system will receive the request from the client and classify the request according to the policy rules. The request is then routed according to the routing rule associated with the class to which the request belongs.

31 Claims, 6 Drawing Sheets

| ClassName | routingrule |
|---|---|
| GoDirect | * |
| GoSpecific | CacheA |
| GoVideo | CacheB, CacheC |

Figure 3a

| Matching Condition | Class Name |
|---|---|
| URL contains .cgi-bin | GoDirect |
| URL suffix .au | GoSpecific |
| Cookie in URL | GoDirect |
| URL suffix .rpm | GoVideo |

POLICY ENABLED WEB CACHING

FIELD OF THE INVENTION

The invention relates to the field of computer networks and in particular, to that of caching services for a computer network. More specifically, a caching service for use on the World Wide Web is disclosed which can improve user response times and reduce the amount of data transmitted over the Web.

BACKGROUND OF THE INVENTION

Caching has been used as a technology to improve user response time and to decrease network bandwidth utilization for distributed applications 10 such as web browsing. In the context of the World Wide Web, it is common to deploy caching services to improve the response time to users and to reduce the amount of data that is transmitted over the Web. The user invokes a browser program to retrieve data from the server in the network. A Uniform Resource Locator or URL identifies the address of the source of the data. Without an intervening cache, the request goes directly to the server, and the server returns the desired information.

When a cache is used in a network, a request for information is first sent to the cache. If the cache contains the desired information it is returned to the client. If the requested information is not found in the cache, the catch retrieves the information from the server and returns the information to the client. The cache will also store a copy of the information locally. Since the local storage of the cache is limited only a small portion of all possible information can maintain locally. Caches may implement various techniques to decide which information is maintained and which is discarded. A very common technique is the least recently used scheme, in which the URL information, which has not been accessed for the longest amount of time, is replaced by the new URL information being accessed. An overview of different caching schemes can be found in the document Aggarwal, C., et al., *Caching on the World Wide Web*, IEEE Transactions on Knowledge and Data Engineering, Vol. 11, No. 1 January/February 1999, pp. 94–107.

There are two common modes for web caching: client proxy caches and transparent caches. In a client proxy cache, the browser is typically configured to send a request for information directly to the cache rather than the server. A transparent cache works like a proxy cache except that the browser need not be configured to send a request to the transparent cache. A transparent cache detects the packets belonging to the web-application by looking at information in the request such as the port number carried in IP packets (Web applications usually carry a port number of 80). The transparent cache then direct packets to the cache.

In some variants of the caching architecture, multiple caches can be deployed in the network. In one example, the proxy uses a static hashing of the URL to determine which cache should receive the request. Different caches can also be arranged in a hierarchy. The browser sends the request to a first cache. If the first cache does not find the URL information locally, the request is sent to a second cache. The second cache can send to a third cache, when the final cache is reached the request is sent to the server. The topology in which caching occurs is usually configurable. An algorithm for static hashing is CARP, or Cache Array Routing Protocol described in Ross, K., *Hash Routing for Collections of Shared Web Caches*, IEEE, Network, November/December 1997, pp. 37–44.

Although caching in the web has been researched extensively, the effectiveness of the caches has been found to be relatively poor. Usually, the probability that a web page is found in the local cache is less than half, possibly around 35–40%. Thus, more than half of the requests result in a cache miss, i.e., they are not found in the cache.

The cache miss factor is high due to a variety of reasons. Many of the URLs, associated with pages which browsers attempt to access, identify data that is dynamic (e.g., a program to be executed at a server commonly called cgi-bin scripts). Some URLs identify information that is highly specific to the user (e.g., uses a cookie or creates a special identifier for the user). Some URLs identify special programs like a video or audio clip that need special handling or special protocols between the client and the server, and cannot be handled by an intervening cache.

Each cache miss adds extra latency to the packet request, which degrades the performance perceived by the browser. Since more than half of the requests result in a cache miss, traditional caching is more likely to result in degraded user performance than improved response time.

Figure 1 illustrates the different components that interact together to implement a prior art caching system. Within this caching system, a client 101 wishes to access a URL that identifies some information located at server 111. The client 101 initially contacts a cache 105. The cache 105 is connected to the client 101 by a network 113. Typically, the network 113 is a campus network or fast local area network. The cache 105 serves multiple clients that are present on the network 113, e.g., another client 103 in the network may access the same cache. The cache 105 connects to the server 111 via a network 107. Typically, network 113 is faster than network 107, so that response time is improved every time there is a hit in the cache. The cache 105 may coordinate caching with other caches in the network, i.e., cache 109 in the network.

In order to improve the caching behavior, a system of multiple proxying caches may be deployed. In addition, special caching servers, that can provide caching techniques that work with cookies or provide a specialized protocol for caching video and audio clips can be added to the network. While there are several caching architectures for interconnecting a multiple number of caches, most do not perform well due to a poor cache hit ratio. Plus, the number of proxying mechanisms deployed in the network adds additional latency in the caching architecture, and usually degrades the performance of the network, rather than improving it.

SUMMARY OF THE INVENTION

A policy enabled caching system based upon policy rules which define whether a request from a client is directed to a cache or a server. The client is coupled to a plurality of caches and to at least one server. The caches may store a subset of the data stored on the server.

The policy enabled caching system stores policy rules which comprise at least one matching condition, where every request containing a matching condition falls into an associated class. Each class will have an associated routing rule, where a routing rule defines the type of routing for all the requests which fall into that class.

The policy enabled caching system will receive the request from the client and classify the request according to the policy rules. The request is then routed according to the routing rule associated with the class to which the request belongs.

BRIEF DESCRIPTION OF THE DRAWINGS

FIG. 3 is a table showing examples of how policy rules may be implemented in an exemplary embodiment of a policy enable caching system.

DETAILED DESCRIPTION OF THE INVENTION

Figure 1:
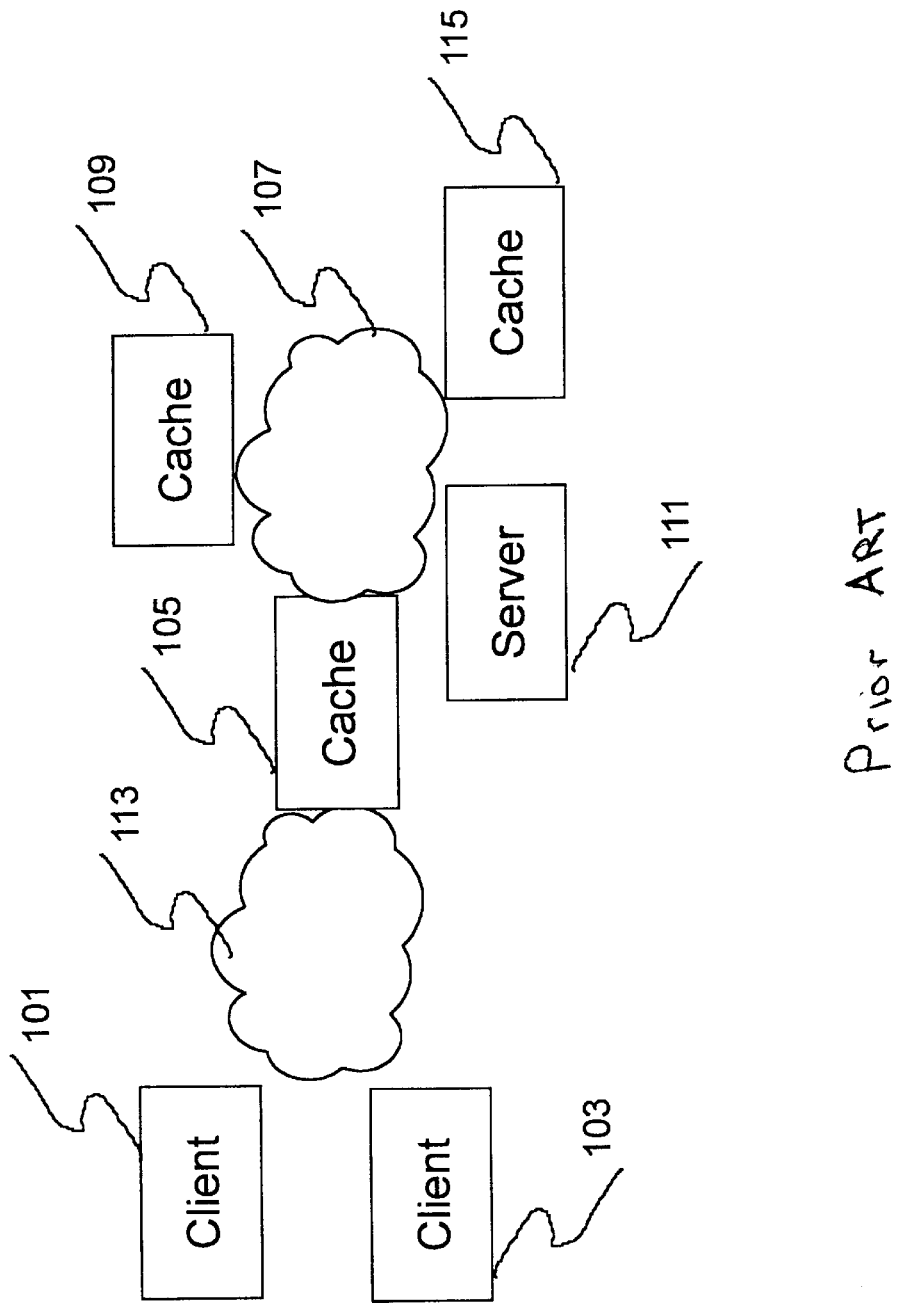
FIG. 1 is a block diagram illustrating a prior art caching system.
Figure 2:
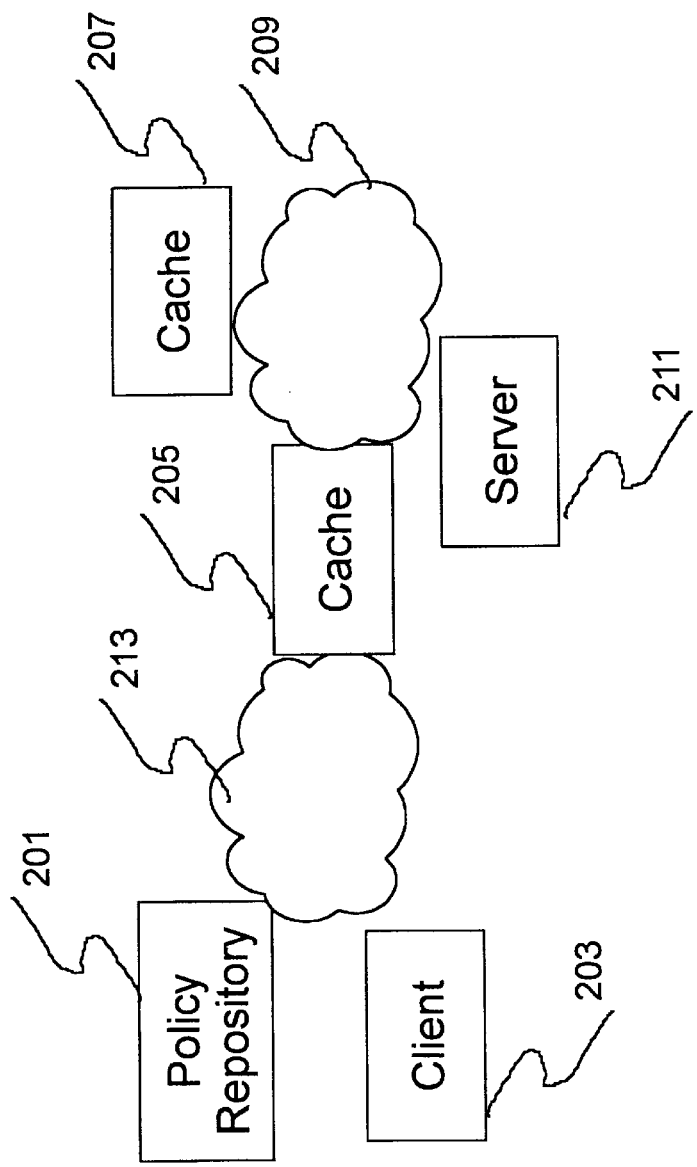
FIG. 2 is a block diagram illustrating a policy enabled caching system in accordance with an exemplary embodiment of the present invention.

FIG. 2 illustrates an exemplary embodiment of a policy-enabled Web caching scheme which consists of a policy repository server 201, and several policy clients 203, 205, 207. The policy clients, policy repository and caches are connected together by the network 213. The policy repository server 201 is also accessible to the caches that are in network 209. The server 211 when being accessed is also connected to the caches via the network 209. A policy client may be a browser 203 which is trying to access URLs over the network (e. g., from the server 211), or a cache 205 which is used by the browser. The policy repository server 201 stores the rules that dictate how the browser (or cache) should behave when operating on specific requests. The rules may dictate whether a browser (or cache) should go directly to the web server, or whether the browser should go to a specific cache, or one of a selected number of caches.

FIG. 3a and FIG. 3b illustrates an example of how policy rules may be implemented in the exemplary embodiment of the policy-enabled web caching architecture. The FIG. 3a is a table that shows three classes: 301, 303 and 305. Each class is named such as "GoSpecific" and each class has an associated routing rule such as "CacheA". Each request that belongs to a particular class will be routed according to that classes routing rule. FIG. 3b is a table that defines the matching conditions and the class associated with that matching condition. A request that contains a matching condition will become part of the associated class, such that a request that contains a "URL suffix .au" will become part of class "GoSpecific".

Referring to FIG. 3a the action taken for each request belonging to class 301 (named GoDirect) is to send the request directly to the server. The action taken for each request belonging to class 303 (named GoSpecific) is to send the request to a specific cache; and the action taken for each request belonging to class 305 (named GoVideo) is to send the request to one of a set of selected caches.

Referring to the table in FIG. 3b there are four classification rules shown: 307, 309, 311 and 313. Each classification rule consists of a matching condition and the name of a class. The matching condition of classification rule 307 is that a request with a URL that contains the substring .cgi-bin will become part of the class "GoDirect ". Referring to FIG. 3a the class "GoDirect" has a routing rule that sends request that belong to the "Go Direct" class directly to the server. Therefore, the policy rule for a request with a URL having the substring of .cgi-bin is to send the request directly to the end-server. The matching condition of classification rule 309 provides for requests with a URL that end with the suffix ".au" should be classified as "GoSpecific" and, referring to FIG. 3a, should be routed to a "CacheA ". The matching condition for classification rule 311 provides any request with a cookie in the URL is classified as "GoDirect" and, referring to FIG. 3a, should be routed directly to the server. The fourth classification rule 313 has a matching condition that any request with a URL containing the suffix of ".rpm" should be classified as "GoVideo" and, referring to FIG. 3a, the request should be directed to one of the caches specified in the list of "GoVideo".

The classification in a policy rule may be done on the basis of any of the fields in the request sent by the client, not just the URL. The information contained in the field may include things like cookies, the suffix of a URL, the requirement for an authentication header, the type of transport protocol used for communication, the existence of a specific header extension in the request, etc. The specification of the policy classification rules can be done using the syntax of regular expressions, a scheme which is well known in the field. The action to be taken on any of the classes can be specified by listing the caches or server to be contacted, using a reserved symbol (e.g., '*') to denote that the server be contacted directly.

The classification rules as described, operate on the basis of matching a condition with the contents of the request made by the client. A degenerate case of this classification rule would be to specify the port numbers or IP addresses of clients and use them to direct cache requests to specific caches or servers. This is the manner in which transparent caching proxies of the prior art operate. However, routing of URL requests on the basis of only port numbers does not allow the differentiation between different types of requests (ones asking for video or audio data, or containing cookies) and is extremely limited since most of the web traffic would be directed on the same port number (port number 80).

As illustrated in FIG. 3b, the matching condition can use the name and characteristics of the request to make policy decisions. The name is usually the URL of the information being obtained, and the characteristics are specified by other fields in the request header, e.g., the type of information (audio/video/text/graphics), cookies, authentication headers, etc. The classification on the basis of name and characteristics is much more flexible than routing on the basis of port numbers. Routing of requests to different caches or servers on the basis of name and characteristics can be done by a client originating the request, or at any intervening server, but routing on the basis of port numbers cannot be done effectively since all requests will have the same port numbers in them.

Figure 4:
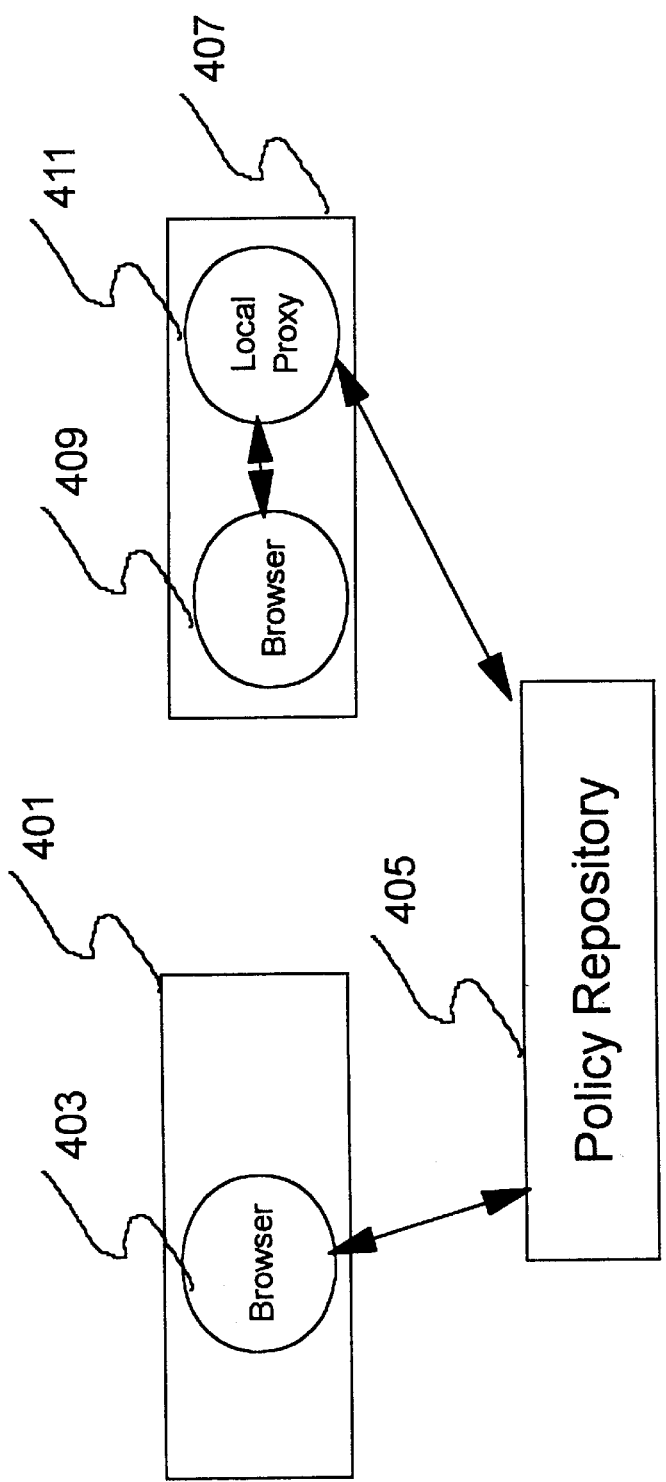
FIG. 4 is a block diagram showing two manners in which the a policy enabled caching system may be implemented in a client workstation.

FIG. 4 illustrates an exemplary embodiment of the policy-enabled web caching architecture. The policy rules are stored in the policy repository server 405. The client workstation 401 contains a browser program 403 which can obtain the policy rules directly from the policy repository server 405. The browser program 403 will receives a request and use the policy rules to determine which cache or server to route the request to. The client workstation 407 contains a browser program 409 and a local proxy 411. The local proxy 411 will obtain the policy rules directly from the policy repository server 405. The browser program 409 will always send a request to the local proxy 411. The local proxy 411 uses the policy rules to determine which cache or server to send the request to.

Figure 5:
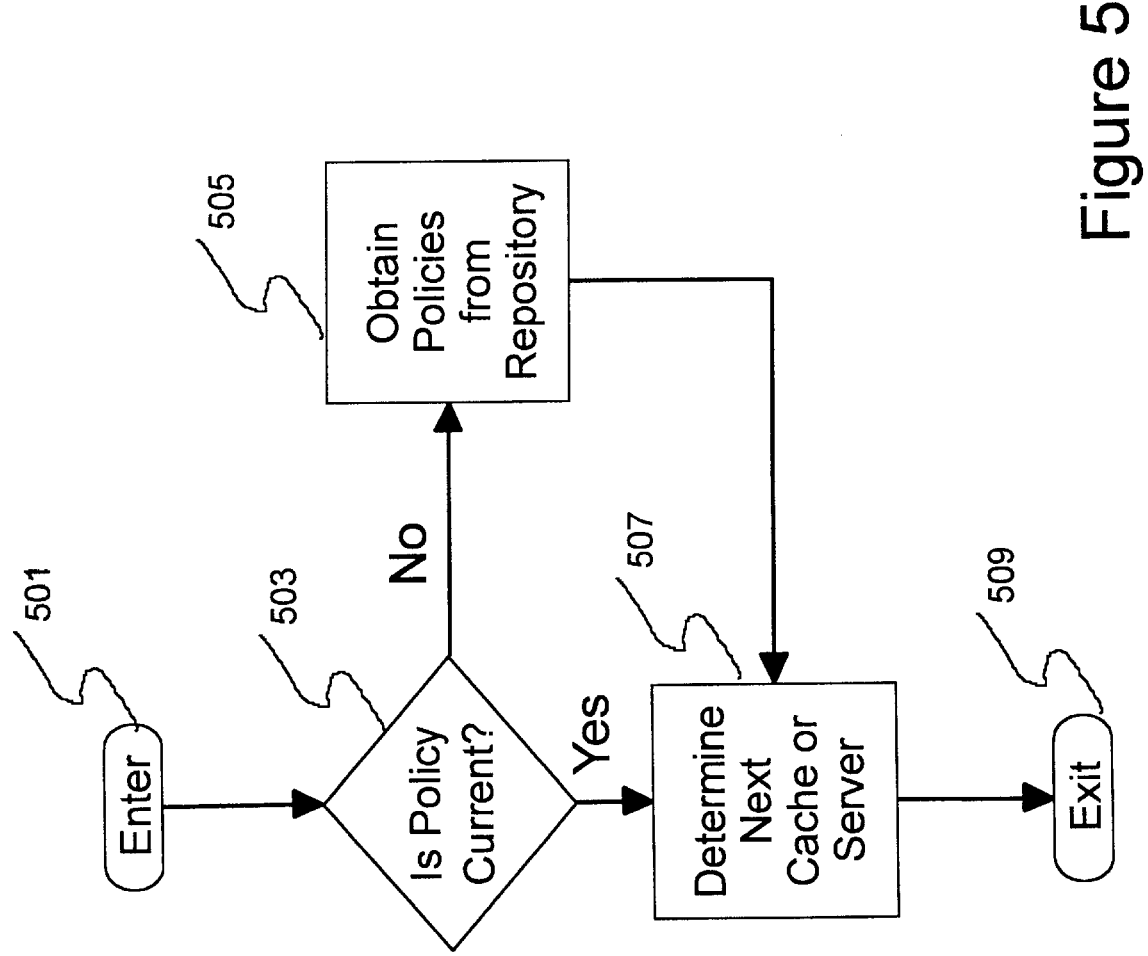
FIG. 5 is a flow chart which illustrates the steps followed by a browser or a cache to obtain information corresponding to a specific URL.

FIG. 5 is a flow chart diagram which illustrates the steps that can be used by the policy enabled browser 401 or the local proxy 411, of FIG. 4, in order to implement web caching in a policy enabled manner. The processing begins at step 501 when a request is formed. In step 503, the browser 401 or local proxy 411 first checks if it has the current set of defined policies from the policy repository server 405. If the check fails, the browser or local proxy would get the current policies from the policy repository server 405 in step 505, and then proceed to step 507. Otherwise processing proceeds directly to step 507. In step 507, the next cache or server to be contacted is determined based on the policy. In step 509, the processing terminates and the browser 401 or local proxy 411 sends the request to the selected cache or the server.

The check for ensuring that the set of polices is current can be implemented in a variety of ways which depend on the manner in which polices are obtained from the policy repository. The browser or local proxy may obtain the set of current policies at regular intervals from the policy repository, in which case the check consists of checking if it is time to fetch the new policies from the policy repository. On the other hand, the policy repository may be notifying the browser or local proxy when there is a change in policies. In this case, the check would consist of checking if such a notification has been received. Other ways could also be devised for this purpose.

The steps outlined in FIG. 5 can also be implemented by a cache which implements support for policies. In these cases, the policies determine next cache or server to be contacted in case a copy of the requested URL is not found locally.

Figure 6:
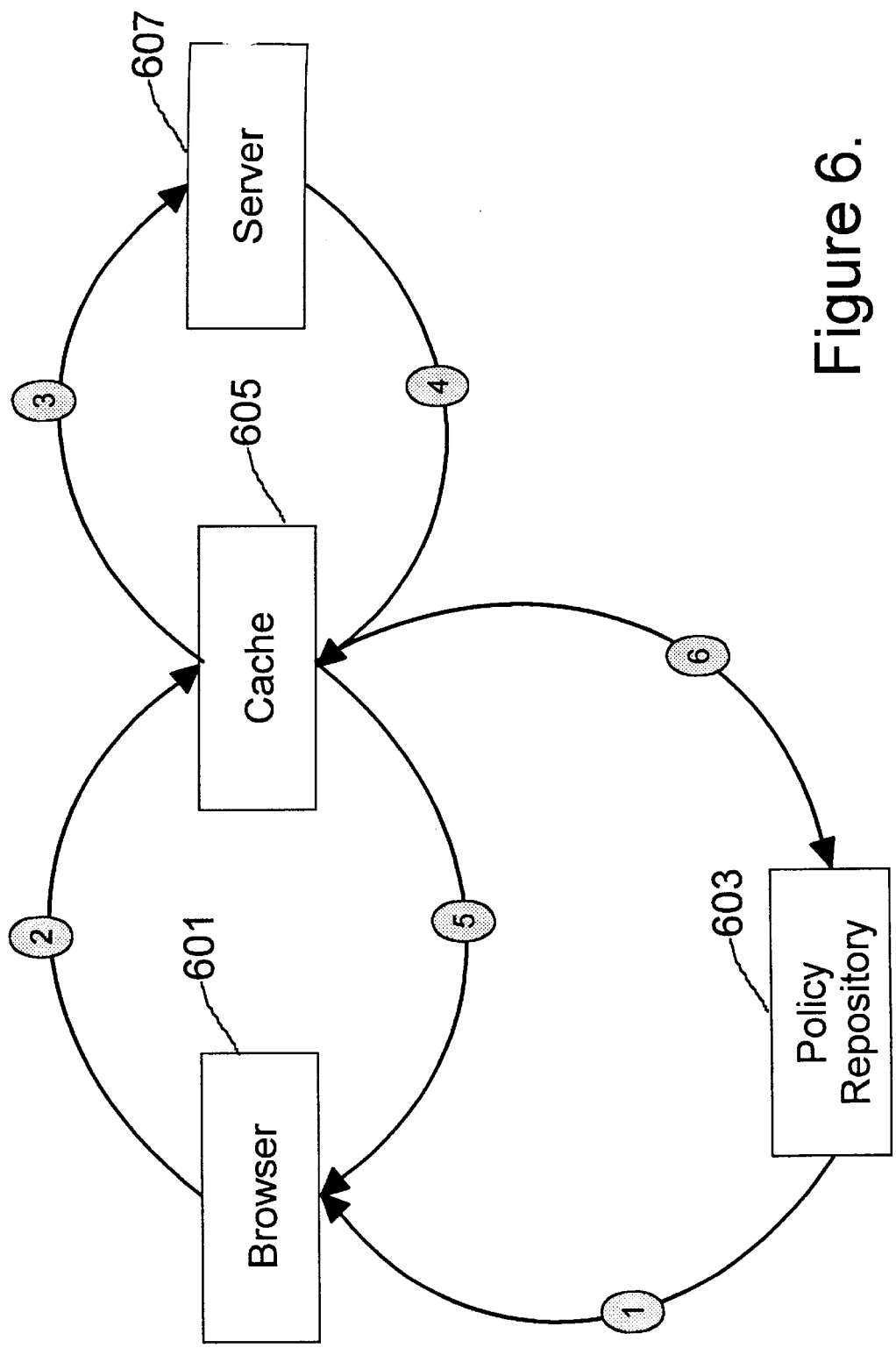
FIG. 6 is a flow diagram illustrating the steps followed by a policy-enabled cache and a cache user to dynamically adjust the policies.

FIG. 6 illustrates a preferred embodiment of the policy-enabled web caching architecture where a cache can revise or update policy rules that are being used by the local proxy or browser. This can be done, e.g., when the client is trying to contact the cache for a URL that is determined not to be cachable. FIG. 6 illustrates the manner in which such a modification occurs. A browser 601 contains a set of policies from a policy repository 603 as shown in interaction 1 and subsequently contacts a cache 605 as dictated by the policies as shown in interaction 2. The cache 605 does not find the information locally and contacts the server 607 as shown in interaction 3. The information obtained from the response 4 of server 607 indicates that the data is not cachable. This indication is carried in the standard protocols used to communicate with the server. When the cache 605 receives the response, it informs the client that the policy should be updated and the specific URL should not be cached via interaction 5. The cache 605 can also update the information in the policy repository 603 so that all clients become aware of the new policy via interaction 6.

The above description was intended to convey the methodology in which the invention of policy enabled caching to be implemented. Those skilled in the art can realize several ways in which this invention can be implemented.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of implementing a policy enabled caching system, where policy rules define whether a request from a client is directed to a cache or a server, said client being coupled to a plurality of caches and to at least one server, wherein said caches may store a subset of the data stored on said server, said method comprising the steps of:

a) storing a plurality of policy rules, said policy rules comprising at least one of 1) a matching condition, where every request containing said matching condition falls into an associated class, and 2) a routing rule for each class, where said routing rule defines the type of routing for all said requests which fall into said class;

b) receiving said request from said client, wherein said request is divided into a plurality of fields where
        in step a) said matching condition is based on any of said fields, wherein said fields include a field for an object name for identifying a requested data and a plurality of fields for characteristics that describe the type of said requested data, c) classifying said request according to said policy rules, and d) routing each request according to classifying of step c.

2. The method of claim 1, where
    in step a) said policy rules include said matching conditions based on said object name or a subset of said object name.

3. The method of claim 1, wherein said characteristics include at least one of text, image video, audio, a cookie and an authentication header, and
    in step a) said policy rules include classes based on said characteristics.

4. The method of claim 1, wherein said object name or said subset of object name includes an indication that said requested data includes dynamic data, and
    in step a) said policy rules include classes based on said indication that said requested data includes dynamic data.

5. The method of claim 4, where
    in step a) said routing rule for classes of dynamic data require routing said request directly to said server.

6. The method of claim 1, wherein prior to step d) the further step of parsing said object name is included, and
    in step a) said policy rules include said matching conditions based on a composition of said object name.

7. The method of claim 6, where
    in step a) said policy rules include said matching conditions based on said composition where said composition includes an indication that said requested data includes dynamic data.

8. The method of claim 7, where
    in step b) said routing rule for classes of dynamic data require directing said request directly to said server.

9. The method of claim 1, where
    in step a) said policy rules include said matching conditions based on key words within said object name.

10. The method of claim 1, wherein said request includes an address or location of a source of said requested data, and
    in step a) said policy rules include said matching conditions based on said address or location of said source of said requested data.

11. The method of claim 1, where
    in step a) said policy rules can be dynamically updated.

12. The method of claim 1, further including the step of:
    e) modifying said routing rules based on the location or IP address of said client.

13. The method of claim 1, further including the step of:
    e) modifying said routing rules based on the network or server load conditions and availability.

14. The method of claim 1, further including the step of:
   e) inserting meta information in a header of a returning object, said returning object being the object of said request, said meta information being inserted by said cache.

15. The method of claim 14, further including:
   in step e) said meta information is based on observed characteristics of said returning object,
   f) modifying said routing rules based on said meta information.

16. The method of claim 15, where
   in step e) said observed characteristics includes said returning object is not cachable.

17. The method of claim 16, where
   in step f) said meta information modifies said routing rules where all future requests from a respective class of non-cachable objects are routed directly to said server.

18. The method of claim 15, where
   in step e) said observed characteristics includes server load condition.

19. The method of claim 15, where
   in step e) said observed characteristics includes cache load condition.

20. The method of claim 15, where
   in step f) said meta information modifies said routing rules where all future requests from said class are routed directly to said server or to an alternate cache.

21. A method of implementing a policy enabled caching system, where policy rules define whether a request from a client is directed to a cache or a server, said client being coupled to a plurality of caches and to at least one server, wherein said caches may store a subset of the data stored on said server, said method comprising the steps of:
   a) storing a plurality of policy rules, said policy rules comprising at least one of 1) a matching condition, where every request containing said matching condition falls into an associated class, and 2) a routing rule for each class, where said routing rule defines the type of routing for all said requests which fall into said class,
   b) distributing said policy rules to a at least one of a local proxy, a policy enabled browser and a policy enabled cache,
   c) receiving said request from said client, wherein said request is divided into a plurality of fields where
      in step a) said matching condition is based on any of said fields, wherein said fields include a field for an object name for identifying a requested data and a plurality of fields for characteristics that describe the type of said requested data,
   d) classifying said request according to said policy rules, and
   e) routing each request according to classifying of step d.

22. The method of claim 21, where
   in step c) said request is received by at least one of said local proxy, said policy enabled browser and said policy enabled cache.

23. The method of claim 21, further including:
   in step a) said policy rules are stored in a policy repository, and
   between steps c) and d) requesting a current one of said policy rules from said policy rules from said policy repository if at least one of said local proxy, said policy enabled browser and said policy enabled cache determines its said policy rules are not currently.

24. The method of claim 23, further including the step of
   f) modifying said policy rules based on observed characteristics of a returning object, said returning object being the object of said request.

25. A policy enabled caching system, where policy rules define whether a request from a client is directed to a cache or a server, said client being coupled to a plurality of caches and to at least one server, wherein said caches may store a subset of the data stored on said server, said policy enabled caching system comprising:
   a storage means for storing a plurality of policy rules, said policy rules comprising at least one of 1) a matching condition, where every request containing said matching condition falls into an associated class, and 2) a routing rule for each class, where said routing rule defines the type of routing for all said requests which fall into said class, wherein said request is divided into a plurality of fields and wherein said matching condition is based on any of said fields, wherein said fields include a field for an object name for identifying a requested data and a plurality of fields for characteristics that describe the type of said requested data
   a classifier unit for comparing said request with said matching conditions and assigning said request to an associated class according to said policy rules, and
   a router for routing said requests, said requests being routed according to said routing rules for the respective class to which said request belongs.

26. A policy enabled caching system of claim 25, further comprising:
   a distribution means where said policy rules stored in said storage means are distributed to a plurality of said classifier units.

27. A policy enabled caching system of claim 26, where
   said classifier unit requests current policy rules if said classifier unit determines its said policy rules are not current.

28. A policy enabled caching system of claim 26, where
   said classifier unit modifies said policy rules based on observed characteristics of a returning object, said returning object being the object of said request and storing said modified policy rules in said storage means.

29. An article of manufacture comprising a computer useable medium having computer readable program code means embodied therein for implementing a policy enabled caching system, where policy rules define whether a request from a client is directed to a cache or a server, said client being coupled to a plurality of caches and to at least one server, wherein said caches may store a subset of the data stored on said server, the computer readable program code means for causing a computer to effect:
   a) storing a plurality of policy rules, said policy rules comprising at least one of 1) a matching condition, where every request containing said matching condition falls into an associated class, and 2) a routing rule for each class, where said routing rule defines the type of routing for all said requests which fall into said class, wherein the type of routing comprises one of routing to a cache and routing to a server;
   b) receiving said request from said client, wherein said request is divided into a plurality of fields where
      in step a) said matching condition is based on any of said fields, wherein said fields include a field for an object name for identifying a requested data and a plurality of fields for characteristics that describe the type of said requested data, c) classifying said request according to said policy rules, and d) routing each request according to classifying of step c.

30. A program storage device readable by machine, tangibly embodying a program of instructions executable by the machine to perform methods for implementing a policy enabled caching system, where policy rules define whether a request from a client is directed to a cache or a server, said client being coupled to a plurality of caches and to at least one server, wherein said caches may store a subset of the data stored on said server, said method comprising the steps of:

a) storing a plurality of policy rules, said policy rules comprising at least one of 1) a matching condition, where every request containing said matching condition falls into an associated class, and 2) a routing rule for each class, where said routing rule defines the type of routing for all said requests which fall into said class;

b) receiving said request from said client, wherein said request is divided into a plurality of fields where
in step a) said matching condition is based on any of said fields, wherein said fields include a field for an object name for identifying a requested data and a plurality of fields for characteristics that describe the type of said requested data, c) classifying said request according to said policy rules, and d) routing each request to one of a cache and a server according to classifying of step c.

31. A computer program product comprising a computer useable medium having computer readable program code means embodied therein for causing implementing a policy enabled caching system, where policy rules define whether a Web page request from a client is directed to a cache or a server, said client being coupled to a plurality of caches and to at least one server, wherein said caches may store a subset of the data stored on said server, said method comprising the steps of:

a) storing a plurality of policy rules for determining, whether to route to a cache or a server, said policy rules comprising at least one of 1) a matching condition, where every request containing said matching condition falls into an associated class, and 2) a routing rule for each class, where said routing rule defines the type of routing for all said requests which fall into said class;

b) receiving said request from said client, wherein said request is divided into a plurality of fields where
in step a) said matching condition is based on any of said fields, wherein said fields include a field for an object name for identifying a requested Web page and a plurality of fields for characteristics that describe the type of said requested Web page, c) classifying said request according to said policy rules, and d) routing each request according to classifying of step c.

\* \* \* \* \*